Sept. 8, 1964 A. J. WILEY ETAL 3,148,177
TREATMENT OF SPENT SULFITE LIQUOR
Filed July 24, 1961
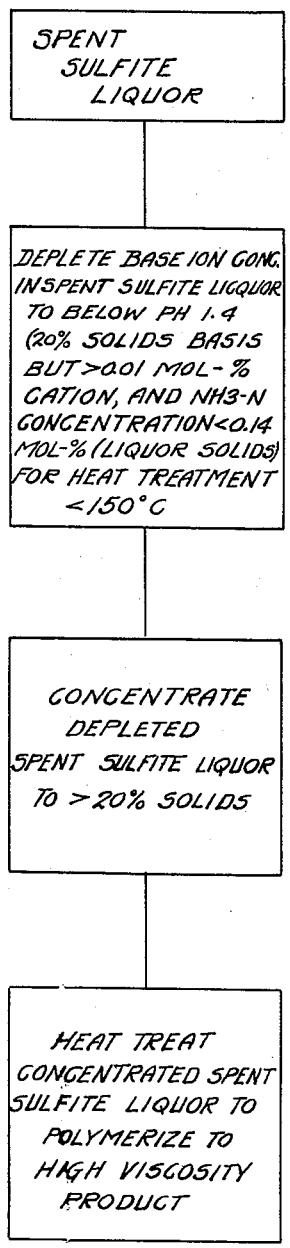
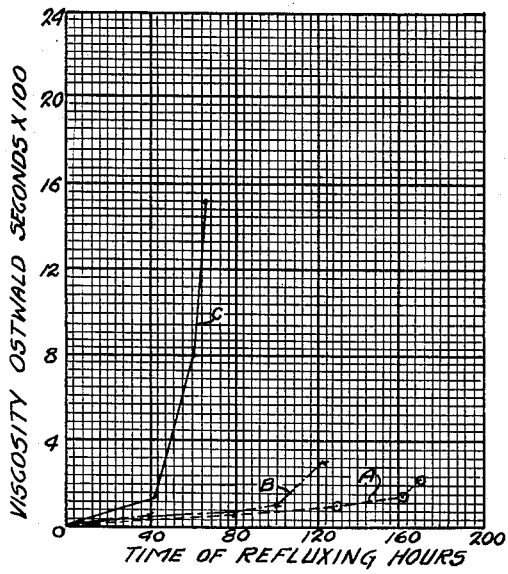
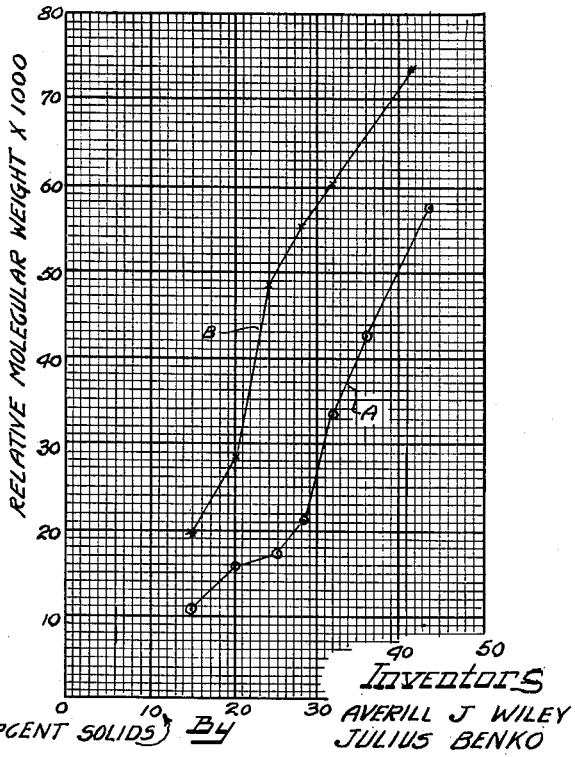
Inventors
AVERILL J WILEY
JULIUS BENKO

United States Patent Office 3,148,177
Patented Sept. 8, 1964

3,148,177
TREATMENT OF SPENT SULFITE LIQUOR
Averill J. Wiley and Julius Benko, Appleton, Wis., assignors to Sulphite Products Corporation, Appleton, Wis., a corporation of Wisconsin
Filed July 24, 1961, Ser. No. 126,207
12 Claims. (Cl. 260—124)

The present invention generally relates to spent liquor, more particularly, it relates to a process for treating spent liquor containing lignosulfonic acids or their salts, such as spent sulfite liquor, spent neutral sulfite semi-chemical liquor, and sulfonated spent kraft liquor to provide improved products, and the products provided by such process.

Among the processes utilized for pulping wood are the sulfite and neutral sulfite semi-chemical processes which employ an aqueous liquor containing a sulfite compound. The sulfite compound is usually calcium bisulfite, sodium bisulfite, magnesium bisulfite or ammonium bisulfite, indicated reagents providing liquors which are referred to herein as pulping base sulfite liquors, particularly calcium base sulfite liquor, magnesium base sulfite liquor, sodium base sulfite liquor and ammonium base sulfite liquor, respectively. As used herein, the term sulfite liquor will refer to such liquor whether used in the sulfite process or in the semi-chemical sulfite process, and it will also be used to include sulfonated spent kraft liquor, all of which liquors include lignosulfonic acids or their salts.

In accordance with the sulfite processes, wood chips or other lignocellulose is cooked under pressure in sulfite liquor so that lignins of the lignocellulose are solubilized and thereby separable from the insoluble cellulose and this is generally known as pulping. The cellulose is then separated from the liquor, the liquor resulting from the separation being known as spent sulfite liquor. Such liquor includes in the aqueous solution extracted lignosulfonates, wood sugars, various other organic compounds, and various inorganic compounds.

The disposal of the vast quantities of spent sulfite liquor provided by the sulfite pulping processes has been an ever present problem in the pulp and paper industry. The spent liquor is dilute, i.e., low in solids, and has not been particularly useful per se. Various processes are known for converting the spent sulfite liquor to useful products. In this connection, processes have been devised for fractionating the liquor and converting stable lignosulfonates therein to useful products, for converting the sugar, etc.

Lignosulfonic acids may be present in the spent liquor and can be produced therein from the lignosulfonates, but the indicated acids are known to be highly reactive and unstable so that they are difficult to obtain and handle. Lignosulfonic acids have a pronounced tendency to convert to unreactive, insoluble ligneous materials. Accordingly, successful recovery of lignosulfonic acids and their polymers from spent sulfite liquor has not been wholly satisfactory.

The lignosulfonic acids and their salts may also be provided, as above indicated, by sulfonating spent liquor from the well-known kraft process. Such sulfonated liquor will be incorporated in this disclosure by the term spent sulfite liquor.

It would be desirable to provide an economical process for treating spent sulfite liquor in a manner to increase the utility thereof. More particularly, it would be desirable to obtain relatively stable lignosulfonic acid compounds. Such a process has now been discovered, the spent sulfite liquor being converted, in accordance with the process, to lignosulfonic acid compounds of improved utility, by modification of the spent sulfite liquor.

Accordingly, the principal object of the present invention is to provide an improved process for treating spent sulfite liquor. It is also an object of the present invention to provide a process for recovering improved products from spent sulfite liquor. It is an additional object of the present invention to provide a process for the treatment of spent sulfite liquor to provide improved lignosulfonic acid compounds.

Further objects and advantages of the present invention will be apparent from a study of the following detailed description and the accompanying drawings in which:

FIGURE 1 is a schematic flow diagram of the process of the present invention;

FIGURE 2 is a graph illustrating polymerization rates at various concentrations of a 70 percent pulping base ion depleted calcium-base spent sulfite liquor and a 64 percent pulping base ion depleted ammonia-base spent sulfite liquor; and FIGURE 3 is a graph showing the effect of pulping base ion depletion of an ammonia-base liquor on the rate of increase in viscosity during polymerization.

The present invention comprises a process for treating spent sulfite liquor to increase the molecular size or weight of contained lignosulfonate compounds and, as a consequence, to increase the viscosity thereof. The process can be successfully operated on a batch, semi-continuous or continuous basis. In accordance with the process, free lignosulfonic acids are produced in the liquor, and such acids are polymerized under controlled heat treatment conditions, without the use of chemical catalysts, to higher viscosity, higher molecular weight compounds so that a stable, readily handleable product is provided. Substantial desulfonation of the liquor during treatment does not occur. The product is useful as an adhesive, detergent, binder, plastic resin, dispersant, etc.

As set forth in FIGURE 1, the process of the present invention for treating spent sulfite liquor more specifically comprises depleting or removing the pulping base ion content of the liquor, that is, the calcium, ammonium, sodium, or magnesium ions, until a low pH value of below 1.4 is reached. Then the liquor is concentrated to a desired high solids content for polymerization without chemical catalysts and with control over desulfonation, oxidation and insolubilization. The solids content of the liquor is adjusted to more than about 20 percent. When ammonia-base spent sulfite liquor is employed in the process of the invention, the ammonia nitrogen concentration in the liquor should be below 0.14 mol percent (calculated as ammonia and based on the dry spent sulfite liquor solids content of the solution) when carrying out the polymerization step at temperatures less than about 150 degrees C. At temperatures above about 150 degrees C. ammonia lignosulfonates are decomposed and polymerization can then proceed at total nitrogen concentrations in the liquor which are at a level greater than 0.14 mol percent.

Controlled polymerization of the pulping base ion-depleted and concentrated liquor is thereupon effected by heating to a desired degree for a suitable period of time.

Now referring more particularly to the steps of the process of the present invention, the spent sulfite liquor which is employed as the starting material may be any such liquor available from convenional sulfite pulping operations. Thus, the spent sulfite liquor may be any spent pulping base sulfite liquor, particularly spent calcium base sulfite liquor, spent magnesium base sulfite liquor, spent sodium base sulfite liquor, spent ammonium base sulfite liquor, and mixtures thereof, whereby compounds are provided which can produce free lignosulfonic acid. The spent liquor is dilute, the solids concentration of such liquor as obtained from the digester in the usual wood pulping process being about 10 percent by weight.

In accordance with the process of the present invention, the spent sulfite liquor is first treated to reduce the pulping base ion content thereof, preferably by at least 30 percent and more preferably by at least about 50 percent, thereby providing in the spent sulfite liquor a substantial concentration of free lignosulfonic acids. Such acids are primarily obtained from the lignosulfonate salts initially present in the spent sulfite liquor. Removal of the indicated ions is continued until the pH of the liquor is reduced to a low value. The pulping base ion-depleted liquor, after concentration to a solids content in excess of 20 percent, by weight, in a subsequent step, should have a pH below 1.4. However, there should remain more than 0.01 mol percent of pulping base ion in the liquor.

Removal of the pulping base ions (calcium, ammonium, magnesium, or sodium) from the spent sulfite liquor can be accomplished in any suitable manner, for example, by ion exchange means, by acid precipitation (where calcium base spent sulfite liquor is used) or by decomposition of ammonia salts (where ammonia base spent sulfite liquor is used). However, it has been found that the preferred way of reducing to the desired degree the pulping base ion concentration in the spent sulfite liquor, regardless of the type of liquor employed, is by electrodialysis. Electrodialysis can be carried out utilizing suitable equipment commercially or otherwise available. One type of electrodialysis apparatus which has been found to be particularly suitable for use with spent sulfite liquor and the process for utilizing the same are disclosed in a co-pending United States application, Serial No. 54,490, filed September 7, 1960, and entitled "Electrodialysis," now Patent No. 3,136,710.

The removal of pulping base ions from the spent sulfite liquor results in release of free acids, especially lignosulfonic acid. The spent sulfite liquor is thereby made more acid in reaction and the pH is substantially reduced. It is reduced to below a pH of 1.4, and preferably to below 0.8 pH, particularly in the case of calcium base liquor and sodium base liquor. However, at least 0.01 mol percent of pulping base ions should remain in the liquor.

It has been found that if pulping base ion depletion of the spent sulfite liquor is not conducted to the indicated extent, there is only a very low rate of increase in molecular size or weight of the liquor during polymerization. A high degree of free acidity as measured by low pH is necessary to promote polymerization without chemical catalysts at practical rates.

Following the pulping base ion depletion step, in accordance with the present invention, and as set forth in FIGURE 1, the solids concentration of the spent sulfite liquor is increased to a concentration which is at least about 20 percent, by weight. It has been found that the concentration step is necessary in order that polymerization of the lignosulfonic acids be carried out satisfactorily. However, it has been found that the concentration may be effected prior to ion depletion, or that concentration may be partially carried out prior to ion depletion and completed after ion depletion. The necessity of concentration will be seen from FIGURE 2 of the accompanying drawings, which is a graph showing relative molecular weight of lignosulfonic acid compounds in treated liquor after heating at 124 degrees C. for 15 hours, of a 70 percent pulping base ion-depleted calcium base spent sulfite liquor (curve A) in comparison with a 64 percent pulping base ion-depleted ammonia-base liquor (curve B), as a function of the solids concentration of the liquors. Thus relatively higher molecular weight compounds were obtained during the same treatment time at the same treatment temperature when the initial solids concentration of the liquor was increased to at least 20 percent by weight.

When solids concentrations substantially below 20 percent, by weight, are utilized, the rate of increase in viscosity and molecular weight in the spent sulfite liquor is sufficiently slow as to usually preclude the employment of such low solids concentration liquor as a starting material. Moreover, it has been found that there is a tendency for such liquor to undergo some depolymerization during heat treatment, in contrast to high solids concentration liquors. When the solids concentration of the spent sulfite liquor immediately before heat treating is at higher level of more than about 45 percent, by weight, it has been found that excessive insolubilization tends to occur in the spent sulfite liquor during the polymerization (unless the liquor is vigorously stirred) instead of the desired controlled increase in viscosity and molecular weight. Accordingly, particularly if the reaction is to be carried out in large vessels, the solids concentrations of spent sulfite liquor to be heat treated for polymerization of the lignosulfonic acids without chemical catalysts should preferably be within the range of from about 20 to about 45 percent, by weight.

Concentration of the spent sulfite liquor can be carried out in any suitable manner, as by distillation at low temperature and decreased pressure, i.e., vacuum distillation, etc. Other methods of concentrating the liquor to the desired solids content will be obvious to those skilled in the art, but freeze concentration appears especially advantageous because of reduced rates of corrosion at low temperatures when processing free acids.

After the spent sulfite liquor has been pulping base ion-depleted and concentrated to the indicated solids concentration, with the pH after such concentration being below 1.4 and preferably below 0.8, the free lignosulfonic acids in the liquor are heat treated to polymerize the same to a controlled degree without chemical catalysts and without substantial desulfonation and insolubilization.

The heat treatment can be carried out in suitable apparatus. It has been found that the heat treatment should, for most purposes, be effected within the temperature range of from about 100 degrees C. to about 250 degrees C. The use of temperatures below 100 degrees C. does not usually result in a sufficiently rapid polymerization to warrant its application.

It has also been found that temperatures substantially in excess of 250 degrees C. usually result in extremely rapid and uncontrolled polymerization with excessive desulfonation of the lignosulfonic acids and in many cases excessive insolubilization. However, within the range of about 100 degrees C. to about 250 degrees C. polymerization in the spent sulfite liquor can be carried out to desired levels of viscosity and relative molecular weights. Within such range, the treatment time will decrease with increasing temperature.

Relatively short treatment times can usually be employed to provide the desired results. Thus, utilizing steam at a pressure of about 150 p.s.i., the desired polymerization in the spent sulfite liquor may be achieved with a 35 percent solids concentration usually in a matter of minutes. One suitable means for carrying out the polymerization step is an autoclave in which steam pressure can be accurately adjusted, as well as treatment time, to provide maximum results.

It has been found that the heat treatment is advantageously carried out in a manner which provides simultaneous vigorous mixing. Thus, it has been found that polymerization may progress 2 to 4 times more rapidly when vigorous mixing is employed during heat treatment than without such mixing. Also, agitation improves the quality of the polymerization products with less tendency toward localized areas of insolubilization or overpolymerization within the mass. Heat treatment at a suitable pressure such that the temperature utilized is a boiling temperature for the spent sulfite liquor assures vigorous mixing. Refluxing of the liquor during heat treatment may also be employed.

Now referring to FIGURE 3 in the accompanying drawings, a graph is presented showing the effect of the extent of pulping base ion depletion on the rate of increase in viscosity during refluxing at 100 degrees C. of three samples of treated ammonia base liquor. In the graph, curve A depicts the viscosity increase with time of refluxing for an untreated sample of the ammonia base liquor, which sample has a pH of 2.85. Curve B indicates a second sample of the ammonia base liquor upon which cation depletion was carried out to an insufficient extent, that is only to a pH of 1.65, representing approximately 20 percent cation depletion. As curves A and B in FIGURE 3 indicate, lengthy refluxing is required to effect even a small viscosity increase in both the untreated sample (A) and the sample pulping base ion depleted to an insufficient extent (B).

In contrast thereto, curve C depicts a third sample of the ammonia base liquor, which sample was pulping base ion-depleted to a pH of 0.7, representing at least about 30 percent depletion. The third sample (C) showed a large increase in viscosity after a relatively short refluxing time. Increases in viscosity such as are indicated by curves A and B in FIGURE 3 are insufficient over the extended refluxing time required to render such treatment of spent sulfite liquor commercially feasible. For effective results it will be seen that pulping base ion-depletion to a pH of less than 1.4 is necessary.

It has further been found that the concentration of nitrogen in the ammonia-base spent sulfite liquor must be carefully controlled in order to assure efficient and adequate polymerization of free lignosulfonic acids during subsequent heating of the ammonia-base spent sulfite liquor. In this connection, it has been determined that the concentration of nitrogen in the ammonia-base spent sulfite liquor should be below 0.14 mol percent before polymerization is satisfactorily effected at temperatures below about 150 degrees C. If the indicated maximum concentration of nitrogen is exceeded, the desired polymerization of free lignosulfonic without chemical catalysts acids does not readily occur at temperatures below about 150 degrees C. At less than that temperature, both the extent and the rate of the polymerization are cut down drastically in the presence of an excessive nitrogen concentration in the ammonia-base spent sulfite liquor, regardless of the pH of the liquor.

The concentration of nitrogen in the ammonia-base spent sulfite liquor, if initially exceeding 0.14 mol percent maximum, can be reduced to below the indicated maximum by various means. Thus, for example, ammonia-base sulfite liquor containing excessive concentrations of nitrogen can be heated to a temperature sufficiently high, for example, above 150 degrees C., so as to decompose nitrogen compounds. However, since the nitrogen is usually present as an ammonia cation, the concentration of nitrogen in the ammonia base liquor can be sufficiently reduced by electrodialysis. Thus, adjustment of the nitrogen concentration of the spent sulfite liquor may be incorporated in the pulping base ion-depletion step along with adjustment of pH of the liquor.

The rate of change of viscosity during the polymerization is closely related to the pH of the solution, i.e., the degree of free acidity and the extent of cation depletion, as previously indicated, faster rates of change in viscosity occurring when the percentage pulping base ion-depletion of the sulfite liquor is higher. The water solubility of the polymerized product somewhat decreases as the molecular size and weight approach a maximum believed to be the order of 60,000 to 300,000 for lignosulfonic acids, with bound sulfur content in excess of about 4 percent. The molecular weight values depend a good deal on the method of analysis. According to the method later described, the relative molecular weight values of the untreated lignosulfonic acids in spent sulfite liquor are in the range of 2,000 to 10,000 while the insolubilization occurs between 60,000 and 100,000. However, factors such as the extent of desulfonation, oxidation, etc., also influence the solubility of the product and sulfonated lignin molecules of most any size may be water insoluble when the sulfone sulfur is substantially reduced, and this generally occurs when such sulfur drops below about 4 percent.

It appears that the presence of sugars in the spent sulfite liquor has an effect on the extent of the polymerization, through condensation of the lignosulfonic acids with reactive sugar degradation products, such as furfural and hydroxymethyl furfural, which are known to result from heat processing sugars at low pH levels. However, satisfactory polymerization readily progresses even without the presence of sugars in their usual concentrations in spent sulfite liquor, so long as the other indicated requirements for the sulfite liquor are present, i.e., pulping base ion-depletion, low pH, suitable solids concentration, etc.

The polymerization can be controlled so that it does not, in contrast to other types of heat treatment, result in substantial desulfonation of the liquor. This is clearly illustrated in the following table:

| Sample | Description of Sample | Refluxing time (hrs.) | Percentage Sulfur | Equiv. Weight | Rel. Mol. Wt. following ion exclusion |
|---|---|---|---|---|---|
| A | 70% ammonium ion depleted ammonia base spent sulfite liquor. | 0 | 7.05 | 262 | 6,300 |
| B | ......do...... | 10 | 7.07 | 264 | 10,050 |
| C | ......do...... | 20 | 6.94 | 267 | 21,200 |
| D | ......do...... | 32.5 | 6.81 | 263 | 30,300 |
| E | ......do...... | ¹20 | 7.05 | 260 | 42,000 |

¹ +2.5 hrs. heat-treatment at 124° C.

The treated spent sulfite liquor product of the process of the present invention has higher viscosities and higher relative molecular weights with other modified physical characteristics in contrast to the untreated spent sufite liquor. These characteristics can be made to vary within wide limits, depending upon the degree of polymerization of the lignosulfonic acids. The products have improved binding properties and dispersing qualities. The polymerized free lignosulfonic acid products are relatively much more reactive than the lignosulfonate salts in the untreated spent sulfite liquor, and yet, can be made, with suitable control of the degree of pulping base ion removed, sufficiently stable so as to be easily processed and handled. They are suitable for a variety of purposes, such as high strength binders for iron ore, hydrophilic swelling gels for irrigation canal sealants, resins with desirable flow characteristics for plastic formulations, improved oxidized dispersants as chelates and sequestrants, etc. Thus, the process of the present invention provides improved products under controlled conditions.

As an example of the increased utility of spent sulfite liquor treated in accordance with the process of the present invention, 2 percent, by weight, of such treated liquor through its improved binding strength has been found to increase the compressive strength of iron ore briquettes almost four times, as compared to briquettes made with the same liquor which has not been subjected to pulping base ion removal and heat treatment in accordance with the process of the present invention.

Moreover, the improved binder provided by the present process has been found to have improved moisture resistance in contrast to untreated spent sulfite liquor binders. The binder provided by the process of the present invention is highly suitable for aggregates of other types, including coal, charcoal, copper ore concentrates, carbon and graphite electrodes, slugs for powder metallurgy, etc.

The solubility of spent sulfite liquor products prepared by the present process can be adjusted by controlling the polymerization step. Thus, polymerized soluble spent sulfite liquor products can be provided which may be added to soil and insolubilized more easily and more rapidly in situ by heat, for example, at 175 degrees C. by a torch, or by the use of lesser quantities of a setting agent, for example, sodium dichromate or the like, so as to seal canal soil to reduce water seepage therefrom. Similarly, polymerized insoluble spent sulfite liquor products can be prepared by the process of the present invention, which products are capable of swelling and filling voids in soil in a manner similar to the high swell forms of bentonite.

In the latter regard, an ammonia-base pulping base ion-depleted heat treated insoluble spent sulfite liquor product prepared in accordance with the present invention was added to soil in a concentration of 2 grams per 100 grams of soil. The spent sulfite liquor solids swelled and sealed the soil so that the water flow per hour from the soil was reduced from 55 cc. to 0.3 cc. Accordingly, the spent sulfite liquor product was found to have utility as a sealant for water canal soil, etc.

Further features of the present invention are illustrated in following examples:

EXAMPLE I

An ammonia-base spent sulfite liquor was divided into a plurality of samples, each sample being ammonium ion-depleted by electrodialysis to an indicated pH value. All samples were reduced to a 40 percent solids concentration by vacuum evaporation and then were divided into a number of sub-samples. All sub-samples were heat treated at 124 degrees C. under pressure and without agitation (i.e., non-boiling conditions), each sub-sample for a different heat treating period of time. The relative molecular weights of the sub-samples were determined in order to evaluate changes in molecular weight with respect to the time of heat treating, percentage of ammonium ion depletion and pH values. The results obtained are set forth in the following table:

*Table II*

| Percentage ammonium ion Depletion | 30 | 40 | 50 | 64 | 85 |
|---|---|---|---|---|---|
| pH Value | 0.70 | 0.48 | 0.35 | 0.25 | 0.10 |
| Length of Heat Treat in Hours: | | | | | |
| 2 | | | 5,100 | 11,600 | 19,700 |
| 4 | | | 10,400 | 15,900 | 27,900 |
| 6 | | | 17,500 | 35,200 | Insoluble |
| 10 | | | | Insoluble | |
| 15 | 13,900 | 18,900 | 27,200 | | |

As seen from Table II an increase in the percentage of ammonium ion depletion was accompanied by a decrease in the pH value and an increase in the relative molecular weight of liquor heat treated for a given period of time. The molecular weight determination was carried out in accordance with the diffusivity method described by one of the inventors (J. Benko) in two papers read before the American Chemical Society, national meeting in New York September 16, 1960. Essentially this method consists of first removing interfering low molecular weight molecules by ion exclusion and then comparing the degree of diffusion through a fritted glass diffusion cell into a KCl solution against a standard substance of known molecular weight.

It was found that an increase in the length of heat treatment was accompanied by an increase in the relative molecular weight of the product. All samples tested indicated substantial improvement, i.e., a substantial increase in molecular weight occurred as a result of the process of the present invention.

EXAMPLE II

A plurality of samples of a calcium base spent sulfite liquor were cation-depleted to different levels and pH values by electrodialysis. Each of the samples were heat treated, after concentration to a 40 percent solids content, at 124 degrees C. without agitation and for a selected period of time. The relative increases in molecular weight were determined, the results being set forth in the following table:

*Table III*

| Percentage calcium ion depletion | 30 | 40 | 50 | 70 | 90 |
|---|---|---|---|---|---|
| pH Value | 0.80 | 0.52 | 0.45 | 0.30 | 0.10 |
| Length of Heat Treat in Hours: | | | | | |
| 2 | | | | 20,000 | 35,000 |
| 4 | | | 21,300 | 32,500 | 48,400 |
| 6 | | | 25,000 | 35,300 | Insoluble |
| 10 | | | | Insoluble | |
| 15 | 16,200 | 29,900 | 46,800 | | |

Substantially similar results were obtained to those described in Example II.

EXAMPLE III

A plurality of samples of yeast plant effluent resulting from fermentation of wood sugars from an ammonia-base spent sulfite liquor were ammonium ion-depleted to different levels and heated without agitation at 124 degrees C. for 15 hours. The relative increases in molecular weight were as set forth in the following table:

*Table IV*

| Percentage ammonium ion depletion: | Relative molecular weight |
|---|---|
| 48 | 14,400 |
| 63 | 24,700 |
| 85 | 37,200 |
| 100 | 47,300 |

As indicated in Table IV, an increase in the percentage of ammonium ion depletion results in an increase in the relative molecular weight of the liquor for the same treatment time and temperature.

EXAMPLE IV

A plurality of samples of sodium base spent sulfite liquor from an Arbiso cook were concentrated to 40 percent solids concentration and treated at a temperature of 124 degrees C. for 15 hours without agitation and at various pH levels, with the results set forth in Table V:

*Table V*

| Sodium ion Depletion, percent | 100 | 80 | none | none | none | none | none |
|---|---|---|---|---|---|---|---|
| pH value | 0.45 | 0.58 | 1.30 | 1.00 | 0.75 | 0.50 | 0.25 |
| Relative Mol Weight | 45,000 | 39,000 | 5,250 | 6,000 | 8,400 | 18,900 | 27,900 |

Table V indicates that regardless of the pH, substantial sodium ion depletion of the spent sulfite liquor is important in order to effect in the subsequent heat treating step a substantial increase in the relative molecular weight of the liquor.

EXAMPLE V

A plurality of samples of magnesium base spent sulfite liquor produced by the Magnefite cook process and having been concentrated to a 40 percent solids concentration were heat treated without agitation at 124 degrees C. for 15 hours at various pH levels, with the results set forth in Table VI:

*Table VI*

| Magnesium ion Depletion, percent | 100 | 80 | none | none | none | none | none |
|---|---|---|---|---|---|---|---|
| pH Value | 0.40 | 0.55 | 1.30 | 1.00 | 0.75 | 0.50 | 0.25 |
| Relative Mol. Wt. | 28,800 | 25,300 | 6,050 | 7,450 | 7,550 | 8,050 | 8,900 |

As indicated in Table VI, substantially no improvement in relative molecular weight occurred in spent sulfite liquor samples having desired pH (obtained solely by acid addition) inasmuch as no magnesium ion depletion was effected on the samples before heating. However, when magnesium ion depletion was carried out, relatively large increases in relative molecular weight of the liquor samples occurred.

EXAMPLE VI

A 70 percent base ion-depleted ammonia-base liquor was concentrated to a 30 percent solids concentration and refluxed at atmospheric pressure for 65.5 hours. A thick gel of relative molecular weight of about 50,000 was produced. Agitation and intimate mixing during the heat treatment were achieved by the boiling action of the liquor.

Another ammonia base liquor 72 percent base ion-depleted was heated at a 35 percent solids concentration without agitation and at a temperature of 124 degrees C. after having been divided into a plurality of samples. Each sample was heated for a different length of time. The results are set forth in Table VII:

Table VII

| | Rel. mol wt. |
|---|---|
| 2 hours heat treatment | 12,700 |
| 4 hours heat treatment | 22,800 |
| 8 hours heat treatment | 28,300 |
| 10 hours heat treatment | 68,000 |

Table VII indicates an increase in relative molecular weight with an increase in the length of heat treatment.

The 72 percent base ion-depleted liquor was also treated with vigorous mixing at 127 degrees C. for 2 hours and had at the end of the heat treatment a relative molecular weight of 24,800, indicating the advantages of heat treating with mixing. Moreover, heat treatment of the same liquor at a higher temperature, 138 degrees C., for 40 minutes with vigorous mixing resulted in an increase of molecular weight to 30,000, indicating that increases in temperature of heat treatment, even over shorter total treating periods of time, can result in increases in relative molecular weight.

EXAMPLE VII

A plurality of samples of sodium ion-depleted sodium lignosulfonates (providing free lignosulfonic acids) having 30 percent solids concentration and at a pH of 0.8 were heat treated at 182 degrees C. for various periods of time in micro-autoclaves without agitation. The following results were obtained:

Table VIII

| Length of of treatment: | Relative mol. weight |
|---|---|
| None | [1] 4,000 |
| 15 minutes | 5,060 |
| 20 minutes | 9,750 |
| 25 minutes | 26,200 |
| 30 minutes | 26,800 |
| 35 minutes | 37,800 |
| 40 minutes | Insolubles |

[1] Approximately.

Table VIII indicates that the polymerization reactions can be carried out in relatively short periods of processing time when conducted at elevated temperatures but that an increase in relative molecular weight still can be expected with an increase in the length of heat treatment time. However, the total heat treatment time can be extended to a point to provide insolubles in the finished product.

EXAMPLE VIII

A calcium base 70 percent calcium ion-depleted spent sulfide liquor having a relative molecular weight of 5,000–6,000 was divided into a plurality of samples, which were then concentrated to various solids concentrations. Each of the samples was heated without agitation for 15 hours at 124 degrees C., the changes in relative molecular weight being set forth in the following table:

Table IX

| Percent solids, by weight: | |
|---|---|
| 57.7 | Insolubles. |
| 48 | Insolubles. |
| 41.2 | Partially insolubles. |
| 36 | Rel. mol. wt 42,500. |
| 32 | Rel. mol. wt 33,100. |
| 28.8 | Rel. mol. wt 21,500. |
| 25 | Rel. mol. wt 17,100. |
| 20 | Rel. mol. wt 16,100. |
| 15 | Rel. mol. wt 10,800. |

As Table IX indicates, solids concentrations substantially above 41.2 percent by weight result in the formation of insoluble products during the heat treatment period. Moreover, where the solids concentration was substantially below 20 percent by weight no substantial improvement in the relative molecular weight was effected by the heat treatment. In this regard, where the solids concentration was only 15 percent, heating for the entire 15 hour period only increased the relative molecular weight 4,000–5,000, i.e., below a commercially significant increase.

EXAMPLE IX

A plurality of samples of ammonia-base 64 percent ammonium ion-depleted spent sulfite liquor having a relative molecular weight of between 5,000–6,000 were concentrated to various solids contents without agitation for 15 hours at 124 degrees C. The changes in relative molecular weights are set forth in Table X:

Table X

| Percent solids, by weight | Relative molecular weight |
|---|---|
| 36 | Insoluble |
| 32 | 60,200 |
| 28 | 55,600 |
| 24 | 48,200 |
| 20 | 28,600 |

Table X indicates substantial increases in molecular weight for a given heating temperature and time as the concentration of solids in the sample before heat treating was increased between 20 percent and 32 percent by weight.

Although the preceding examples are directed to batch operations, the present process can also be practiced successfully on a continuous basis. Thus, facilities can be readily provided for continuous polymerization of lignosulfonic acids in spent sulfite liquor, after pulping base ion depletion with adjustment of pH and nitrogen concentration of the liquor, and concentration of the liquor to desired solids level. The polymerization can be continuously carried out, for example, in a stainless steel coil immersed in a heat source (hot oil, etc.), with the liquor being forced through the coil. The liquor can be preheated in a holding vessel before introduction into the coil, and the coil length and liquor flow rate may be adjusted, along with the treating temperature to provide desired results. A typical spent sulfite liquor (having a 30 percent solids concentration, pH below 1.4 and nitrogen concentrations below 0.14 mol percent) was passed through a $\frac{1}{16}$ inch diameter, 28 foot long, stainless steel coil in an oil bath at 200 degrees C., after preheating to 143 degrees C. in an autoclave. An increase in the relative molecular weight from 5,400 to 18,300 for a heat treating time of 90 seconds was obtained.

Other high temperature processing procedures in accordance with the present invention such as spray drying, at temperatures above about 150 degrees C. have also been found to polymerize free lignosulfonic acids with significant increases in relative molecular weight and improvement in product quality. Example X below sets forth a typical spray drying procedure:

EXAMPLE X

Batches of ammonia-base spent sulfite liquor were electrodialyzed to various degrees of pulping base ion depletion (up to about 70 percent) and pH's (as low as 0.5) then concentrated at 70 degrees C. under reduced pressures to about 30 percent, by weight, solids concentration. Samples were taken from the batches, and subjected to dialysis in cellophane against water. The portion remaining after dialysis was then tested for molecular weights of solids. In most instances, the relative molecular weights were about 12,000.

The batches were then spray dried at various inlet and outlet drying temperatures, and in each instance the spray dried product was dissolved in water and dialyzed in cellophane against water to remove impurities and low molecular weight compounds. The weight percentage of total treated (spray dried) solids retained within the cellophane after dialysis and relative molecular weight thereof were determined. The results are set forth in the following Table XI:

*Table XI*

| Drying Conditions, Temperature ° F. | | | Rel. Mol. Wt. on Dialyzed Lignosulfonic Acids | Weight Percent of Total Dried Solids Retained After Dialysis |
|---|---|---|---|---|
| Inlet | Outlet | pH | | |
| 300 | 230 | 0.5 | 28,400 | 31 |
| 300 | 230 | 1.75 | 14,150 | 30 |
| 620 | 380 | 1.75 | 13,800 | 31 |
| 620 | 380 | 4.75 | 14,500 | 21 |

As seen from Table XI the lower pH samples, i.e., those with greater pulping base ion-depletion, underwent more pronounced increases in relative molecular weight, i.e., polymerization during spray drying. Thus, the 0.5 pH batch was polymerized from about 12,000 to about 28,400 relative molecular weight, whereas both the 1.75 and 4.75 pH batches showed only small increases (13,800–14,150 depending on temperature for the 1.75 batch, and 14,500 for the 4.75 pH batch). The two 1.75 pH batches indicate that differences in the spray drying temperature had little effect on the degree of polymerization and relative molecular weight increase. The products provided by the spray drying were of high quality and comparable to those obtained by other techniques employing the present invention. The practicality of carrying out the process of the present invention utilizing a spray drying technique for the polymerizing step is clearly demonstrated by Example X.

Various features of the present invention are set forth in the appended claims.

What is claimed is:

1. A process for treating spent sulfite liquor, which process comprises treating a spent sulfite liquor to remove at least about 30 percent of the pulping base ions present therein, thereby providing in the spent sulfite liquor a substantial concentration of free lignosulfonic acids, concentrating said liquor to provide a concentrated liquor having a solids content between about 20 percent and about 45 percent by weight, and polymerizing the lignosulfonic acids present in said concentrated liquor by heating said concentrated liquor at a temperature between about 100° C. and 250° C., whereby the molecular weight and the viscosity of said concentrated liquor are increased.

2. A process for treating spent sulfite liquors, which process comprises treating a spent sulfite liquor to remove at least about 30 percent of the pulping base ions present therein but retaining more than about 0.01 mol percent pulping base ions in the liquor solids, concentrating said liquor to provide a concentrated liquor having a solids content between about 20 percent and about 45 percent by weight, said concentrated liquor having a pH below about 1.4, and polymerizing the lignosulfonic acids present in said concentrated liquor by heating said concentrated liquor at a temperature between about 100° C. and about 250° C., whereby the molecular weight and the viscosity of said concentrated liquor are increased.

3. A process for treating spent sulfite liquor, which process comprises treating a spent sulfite liquor to remove at least about 50 percent of the pulping base ions present therein, thereby providing in the spent sulfite liquor a substantial concentration of free lignosulfonic acids, concentrating said liquor to provide a concentrated liquor having a solids content between about 20 percent and about 45 percent by weight, and polymerizing the lignosulfonic acids present in said concentrated liquor by heating said concentrated liquor at a temperature between about 100° C. and about 250° C., whereby the molecular weight and the viscosity of said concentrated liquor are increased.

4. A process for treating spent sulfite liquor, which process comprises treating a spent sulfite liquor to remove at least about 50 percent of the pulping base ions present therein, thereby providing in the spent sulfite liquor a substantial concentration of free lignosulfonic acids, concentrating said liquor to provide a concentrated liquor having a solids content between about 20 percent and about 45 percent by weight, said concentrated liquor having a pH below about 0.8, and polymerizing the lignosulfonic acid present in said concentrated liquor by heating said concentrated liquor at a temperature between about 100° C. and about 250° C., whereby the molecular weight and the viscosity of said concentrated liquor are increased.

5. A process for treating spent sulfite liquor, which process comprises treating a spent sulfite liquor to remove at least about 50 percent of the pulping base ions present therein but retaining more than about 0.01 mol percent pulping base ions in the liquor solids, thereby providing in the spent sulfite liquor a substantial concentration of free lignosulfonic acids, concentrating said liquor to provide a concentrated liquor having a solids content between about 20 percent and about 45 percent by weight, said concentrated liquor having a pH below about 0.8, and polymerizing the lignosulfonic acid present in said concentrated liquor by heating said concentrated liquor at a temperature between about 100° C. and about 250° C., whereby the molecular weight and the viscosity of said concentrated liquor are increased.

6. A process for treating spent sulfite liquor, which process comprises electrodialyzing a spent sulfite liquor to remove at least about 50 percent of the pulping base ions present therein but retaining more than about 0.01 mol percent pulping base ions in the liquor solids, thereby providing in the spent sulfite liquor a substantial concentration of free lignosulfonic acids, concentrating said liquor to provide a concentrated liquor having a solids content between about 20 percent and about 45 percent by weight, said concentrated liquor having a pH below about 0.8, polymerizing the lignosulfonic acid present in said concentrated liquor by heating said concentrated liquor at a temperature between about 100° C. and about 250° C., whereby the molecular weight and the viscosity of said concentrated liquor are increased.

7. A process for treating calcium-base spent sulfite liquor, which process comprises treating a calcium ion containing spent sulfite liquor to remove at least about 50 percent of the calcium ions therein but retaining more than 0.01 mol percent calcium ions in the liquor solids, thereby providing in the spent sulfite liquor a substantial concentration of free lignosulfonic acids, concentrating said liquor to provide a concentrated liquor having a solids content between about 20 percent and about 45 percent by weight, and polymerizing the lignosulfonic acid present in said concentrated liquor by heating said concentrated liquor at a temperature between about 100° C. and about 250° C., whereby the molecular weight and the viscosity of said concentrated liquor are increased.

8. A process for treating sodium-base spent sulfite liquor, which process comprises treating a sodium ion containing spent sulfite liquor to remove at least about 50 percent of the sodium ions therein but retaining more than 0.01 mol percent sodium ions in the liquor solids, thereby providing in the spent sulfite liquor a substantial concentration of free lignosulfonic acids, concentrating said liquor to provide a concentrated liquor having a solids content between about 20 percent and about 45 percent by weight, and polymerizing the lignosulfonic acid present in said concentrated liquor by heating said concentrated liquor at a temperature between about 100° C. and about 250° C., whereby the molecular weight and the viscosity of said concentrated liquor are increased.

9. A process for treating magnesium-base spent sulfite liquor, which process comprises treating a magnesium ion containing spent sulfite liquor to remove at least about 50 percent of the magnesium ions therein but retaining more than 0.01 mol percent magnesium ions in the liquor solids, thereby providing in the spent sulfite liquor a substantial concentration of free lignosulfonic acids, concentrating said liquor to provide a concentrated liquor having a solids content between about 20 percent and about 45 percent by weight, and polymerizing the lignosulfonic acid present in said concentrated liquor by heating said concentrated liquor at a temperature between about 100° C. and about 250° C., whereby the molecular weight and the viscosity of said concentrated liquor are increased.

10. A process for treating ammonia-base spent sulfite liquor which process comprises treating an ammonium ion containing spent sulfite liquor to remove at least about 50 percent of the ammonium ions present therein, concentrating said liquor to provide a concentrated liquor having a solids content between about 20 percent and about 45 percent by weight, said concentrated liquor having a pH less than about 0.8, said concentrated liquor containing less than 0.14 mol percent of the liquor solids of ammonia nitrogen, and polymerizing the lignosulfonic acid present in said concentrated liquor by heating said concentrated liquor at a temperature between about 100° C. and about 150° C., whereby the molecular weight and the viscosity of said concentrated liquor are increased.

11. A process for treating ammonia-base spent sulfite liquor which process comprises treating an ammonium ion containing spent sulfite liquor to remove at least about 50 percent of the ammonium ions present therein, concentrating said liquor to provide a concentrated liquor having a solids content between about 20 percent and about 45 percent by weight, said concentrated liquor having a pH less than about 0.8, and polymerizing the lignosulfonic acid present in said concentrated liquor by heating said concentrated liquor at a temperature between about 150° C. and about 250° C., whereby the molecular weight and the viscosity of said concentrated liquor are increased.

12. An aqueous solution of polymeric lignin derived compounds, which solution comprises lignosulfonic acid polymers having an average relative molecular weight in excess of about 10,000 obtained by the thermal polymerization of a spent sulfite liquor concentrate, said concentrate containing from about 20 percent to about 45 percent by weight of solids, said spent sulfite liquor prior to being concentrated having been treated to remove at least about 30 percent of the pulping base ions therein, said solution having a pH below about 1.4.

References Cited in the file of this patent
UNITED STATES PATENTS 1,948,858    Howard _____ Feb. 27, 1934
3,025,235    Smith et al. _____ Mar. 13, 1962